United States Patent
Mitsuhashi

(10) Patent No.: US 10,177,408 B2
(45) Date of Patent: Jan. 8, 2019

(54) NON-AQUEOUS ELECTROLYTE SECONDARY BATTERY AND METHOD FOR PRODUCING SAME

(71) Applicant: TOYOTA JIDOSHA KABUSHIKI KAISHA, Toyota-shi, Aichi (JP)

(72) Inventor: Toshihiko Mitsuhashi, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 530 days.

(21) Appl. No.: 14/761,487

(22) PCT Filed: Nov. 13, 2013

(86) PCT No.: PCT/JP2013/080684
§ 371 (c)(1),
(2) Date: Jul. 16, 2015

(87) PCT Pub. No.: WO2014/115403
PCT Pub. Date: Jul. 31, 2014

(65) Prior Publication Data
US 2017/0005368 A1  Jan. 5, 2017

(30) Foreign Application Priority Data
Jan. 23, 2013 (JP) .................................. 2013-010394

(51) Int. Cl.
*H01M 10/0567* (2010.01)
*H01M 2/34* (2006.01)
(Continued)

(52) U.S. Cl.
CPC ....... *H01M 10/0567* (2013.01); *H01M 2/345* (2013.01); *H01M 4/13* (2013.01);
(Continued)

(58) Field of Classification Search
CPC ......... H01M 10/0567; H01M 10/4235; H01M 10/052; H01M 2/345; H01M 4/366;
(Continued)

(56) References Cited

U.S. PATENT DOCUMENTS

| 5,922,640 A | * | 7/1999 | Hirai | ........................ | B01J 20/20 |
| | | | | | 502/401 |
| 2008/0008928 A1 | * | 1/2008 | Partin | ................. | H01M 2/0285 |
| | | | | | 429/61 |

(Continued)

FOREIGN PATENT DOCUMENTS

| JP | 2008262859 A | * 10/2008 | ............ H01M 10/36 |
| JP | 2010-198858 A |   9/2010 | |

(Continued)

OTHER PUBLICATIONS

Machine translation of JP-2008262859-A (Year: 2008).*

*Primary Examiner* — Eugenia Wang
(74) *Attorney, Agent, or Firm* — Sughrue Mion, PLLC

(57) ABSTRACT

The non-aqueous electrolyte secondary battery 10 according to the present invention is provided with an electrode body 50 including a positive electrode 64 that contains a positive electrode active material and a negative electrode 84 that contains a negative electrode active material, a non-aqueous electrolyte, and a battery case 15 that houses the electrode body and the non-aqueous electrolyte. The non-aqueous electrolyte contains a complex, which contains copper (I) chloride as a constituent component and which is capable of adsorbing at least carbon monoxide and carbon dioxide, and a coating film that contains at least one of phosphorus and boron is formed on the surface of the negative electrode active material.

6 Claims, 8 Drawing Sheets

(51) Int. Cl.
  *H01M 4/36*   (2006.01)
  *H01M 10/42*  (2006.01)
  *H01M 4/13*   (2010.01)
  *H01M 10/052* (2010.01)
  *H01M 10/0525* (2010.01)

(52) U.S. Cl.
  CPC ......... *H01M 4/366* (2013.01); *H01M 10/052* (2013.01); *H01M 10/4235* (2013.01); *H01M 10/0525* (2013.01); *H01M 2200/20* (2013.01); *H01M 2220/20* (2013.01); *Y02E 60/122* (2013.01); *Y02P 70/54* (2015.11); *Y02T 10/7011* (2013.01)

(58) Field of Classification Search
  CPC ... H01M 4/13; H01M 2200/20; Y02E 60/122; Y02P 70/54; Y02T 10/7011

See application file for complete search history.

(56) References Cited

U.S. PATENT DOCUMENTS

| | | | |
|---|---|---|---|
| 2010/0024204 A1* | 2/2010 | Min | H01M 10/0567 29/623.2 |
| 2012/0288751 A1* | 11/2012 | Kako | H01M 2/166 429/188 |
| 2013/0022880 A1* | 1/2013 | Tsujioka | H01G 11/64 429/345 |
| 2013/0140727 A1* | 6/2013 | Kuczynski | B29C 45/0025 264/40.6 |
| 2013/0183580 A1* | 7/2013 | Kako | H01M 4/1391 429/206 |
| 2014/0193706 A1* | 7/2014 | Morinaka | H01M 10/0567 429/200 |

FOREIGN PATENT DOCUMENTS

| | | | | |
|---|---|---|---|---|
| JP | 2012-059489 A | | 3/2012 | |
| WO | WO-2011125397 A1 | * | 10/2011 | .............. H01G 11/64 |
| WO | WO-2013031551 A1 | * | 3/2013 | ........ H01M 10/0567 |

* cited by examiner

NON-AQUEOUS ELECTROLYTE SECONDARY BATTERY AND METHOD FOR PRODUCING SAME

CROSS REFERENCE TO RELATED APPLICATIONS

This application is a National Stage of International Application No. PCT/JP2013/080684, filed Nov. 13, 2013, claiming priority based on Japanese Patent Application No. 2013-010394, filed Jan. 23, 2013, the contents of all of which are incorporated herein by reference in their entirety.

TECHNICAL FIELD

The present invention relates to a non-aqueous electrolyte secondary battery and a method for producing same.

BACKGROUND ART

Lithium ion secondary batteries and other types of non-aqueous electrolyte secondary battery are becoming increasingly important as power sources fitted to vehicles and power sources for personal computers, hand-held terminals and the like. In particular, lithium ion secondary batteries, which are lightweight and achieve high energy density, are preferred as vehicle-mounted high output power sources.

In non-aqueous electrolyte secondary batteries such as lithium ion secondary batteries, some of the non-aqueous electrolyte decomposes during charging, and a coating film formed from this decomposition product, that is, a SEI (Solid Electrolyte Interface) film, can be formed on the surface of a negative electrode active material (for example, natural graphite particles). The SEI film has the function of protecting the negative electrode active material, but is formed by consuming charge carriers (for example, lithium ions) in the non-aqueous electrolyte. That is, if a charge carrier is immobilized on the SEI film, the charge carrier can no longer contribute to the battery capacity. Therefore, a large quantity of SEI film is a possible cause of a deterioration in capacity retention rate (a deterioration in cycle characteristics).

In order to address this problem, a variety of additives have been incorporated in non-aqueous electrolytes in order to form a stable coating film in advance on the surface of a negative electrode active material instead of a SEI film. In non-aqueous electrolyte secondary batteries provided with coating films formed by decomposition of additives, it is known that reactive resistance is lowered and battery life is improved. For example, Patent Literature 1 discloses a non-aqueous electrolyte for a secondary battery, wherein the non-aqueous electrolyte contains a compound having an oxalate complex as an anion (hereinafter referred to as an "oxalate complex compound").

CITATION LIST

Patent Literature

Patent Literature 1: Japanese Patent Application Publication No. 2010-198858
Patent Literature 2: Japanese Patent Application Publication No. 2012-59489

SUMMARY OF INVENTION

Technical Problem

In non-aqueous electrolyte secondary batteries that contain oxalate complex compounds as additives, it is possible to form a stable coating film on the surface of a negative electrode active material by decomposing the oxalate complex compound during initial charging and discharging. Here, as the concentration of the oxalate complex compound in the non-aqueous electrolyte increases, a coating film tends to be formed in a preferred form on the surface of the negative electrode active material. However, carbon monoxide (CO) and carbon dioxide ($CO_2$) are mainly formed from reductive decomposition of the oxalate complex compound when the coating film is formed. Therefore, as the concentration of the oxalate complex compound in the non-aqueous electrolyte increases, large quantities of CO and $CO_2$, which are produced by reductive decomposition of the oxalate complex compound, are present inside the battery case. As a result, the pressure inside the battery case can rise. If the pressure inside the battery case becomes too great, the volume inside the non-aqueous electrolyte secondary battery increases, which leads to concerns that the battery case will expand in the thickness direction. If the battery case expands in the thickness direction in this way, it becomes difficult to construct a battery pack having a prescribed shape by bundling a plurality of (single) non-aqueous electrolyte secondary batteries.

The present invention has been created in order to solve these existing problems, and an objective of the present invention is to provide a non-aqueous electrolyte secondary battery in which a prescribed battery shape (that is, a prescribed thickness) is maintained by suppressing an increase in pressure inside the battery case, and which is provided with a coating film in a preferred form on the surface of the negative electrode active material, and a method for producing same.

Solution to Problem

In order to achieve this objective, the present invention provides a method for producing a non-aqueous electrolyte secondary battery that is provided with: an electrode body including a positive electrode that contains a positive electrode active material, and a negative electrode that contains a negative electrode active material; a non-aqueous electrolyte; and a battery case that houses the electrode body and the non-aqueous electrolyte. That is, the method for producing a non-aqueous electrolyte secondary battery disclosed here includes the steps of: preparing a positive electrode that contains a positive electrode active material, and a negative electrode that contains a negative electrode active material; preparing an electrode body using the prepared positive electrode and negative electrode; preparing an assembly by housing the electrode body in the battery case and introducing, into the battery case, a non-aqueous electrolyte which contains an oxalate complex compound containing at least one of phosphorus and boron as a constituent element, and a complex (hereinafter referred to as a "copper (I) chloride complex") which contains copper (I) chloride a constituent component and which is capable of adsorbing at least (molecular) carbon monoxide and (molecular) carbon dioxide; and subjecting the assembly to initial charging until a prescribed charging voltage is reached.

In the present description "non-aqueous electrolyte secondary battery" means a battery provided with a non-aqueous electrolyte (typically, an electrolyte that contains a supporting salt (supporting electrolyte) in a non-aqueous solvent (an organic solvent)).

In addition, in the present description "secondary battery" generally means a battery which can be repeatedly charged and discharged, and is a term that includes a so-called chemical battery, such as a lithium ion secondary battery, and a physical battery such as an electrical double layer capacitor.

According to the method for producing a non-aqueous electrolyte secondary battery provided by the present invention, the oxalate complex compound, which contains at least one of phosphorus and boron as a constituent element and which is contained in the non-aqueous electrolyte, decomposes when the assembly is subjected to a prescribed charging process, and a coating film derived from the oxalate complex compound is formed on the surface of the negative electrode active material. The non-aqueous electrolyte secondary battery provided with this coating film exhibits excellent battery characteristics (low reactive resistance and high capacity retention rate). In addition, during this charging process, decomposition of the oxalate complex compound generates mainly CO and $CO_2$, and the CO and $CO_2$ diffuse inside the battery case. However, in the present invention, the copper (I) chloride complex is contained in the non-aqueous electrolyte, and the CO and $CO_2$ are absorbed (adsorbed) by the copper (I) chloride complex. In this way, it is possible to suppress an increase in pressure inside the battery case. Therefore, deformation of the battery case (and in particular deformation in the thickness direction) caused by the generation of gas is prevented and it is possible to produce a non-aqueous electrolyte secondary battery able to stably constitute a battery pack at a preset binding force. In addition, according to this production method, a step of removing gas (typically CO and $CO_2$), which is generated by decomposition of the oxalate complex compound, from the battery case is not required. It is preferable for a copper (I) chloride-pyridine complex to be used as the complex containing copper (I) chloride as a constituent component. The copper (I) chloride-pyridine complex is particularly excellent in terms of absorbing (adsorbing) CO and $CO_2$.

Moreover, Patent Literature 2 discloses a laminated battery (a lithium ion battery) in which a gas adsorption agent is disposed at a corner part of a housing part that houses an electrode group, but the gas adsorption agent is disposed outside of the electrode group, and is different from the constitution of the present invention described above.

In a preferred aspect of the production method disclosed here, the non-aqueous electrolyte further contains a gas generating agent able to generate a gas through decomposition when the battery voltage exceeds a prescribed voltage, and the battery case is provided with a current interrupt device that activates when the pressure inside the battery case rises as a result of the gas being generated.

When the battery voltage of the non-aqueous electrolyte secondary battery exceeds a prescribed voltage, the gas generating agent decomposes and generates gas. The generated gas causes the pressure inside the battery case to rise. When the pressure inside the battery case exceeds a prescribed value, the current interrupt device activates. Here, CO and $CO_2$ absorbed (adsorbed) by the copper (I) chloride complex (for example, a copper (I) chloride-pyridine complex) contained in the non-aqueous electrolyte are released from the copper (I) chloride complex into the battery case. Therefore, when the battery voltage of the non-aqueous electrolyte secondary battery exceeds a prescribed voltage, the quantity of gas able to be present inside the battery case increases. As a result, the current interrupt device can activate rapidly. Therefore, it is possible to produce a highly reliable non-aqueous electrolyte secondary battery in which it is possible to ensure that a sufficient quantity of gas is generated when the battery voltage exceeds a prescribed voltage. In addition, when the battery voltage exceeds a prescribed voltage, the CO and $CO_2$ adsorbed by the copper (I) chloride complex are released inside the battery case, and it is possible to increase the pressure inside the battery case. Therefore, it is possible to reduce the quantity of gas generating agent added to the non-aqueous electrolyte.

In another preferred aspect of the production method disclosed here, the concentration of the complex in the non-aqueous electrolyte is at least 16 mol/L relative to 1 mol/L of the oxalate complex compound.

According to this constitution, the copper (I) chloride complex can more effectively adsorb the CO and $CO_2$ generated by the reductive decomposition of the oxalate complex compound.

In another preferred aspect of the production method disclosed here, the concentration of the oxalate complex compound in the non-aqueous electrolyte is 0.02 mol/L to 0.04 mol/L.

According to this constitution, reactive resistance is reduced and it is possible to produce a non-aqueous electrolyte secondary battery having an excellent capacity retention rate.

In another preferred aspect of the production method disclosed here, $LiPF_2(C_2O_4)_2$ is used as the oxalate complex compound. According to this constitution, a coating film can be formed in a preferred form on the surface of the negative electrode active material.

The present invention also provides a non-aqueous electrolyte secondary battery as another aspect for achieving the objective mentioned above. That is, the non-aqueous electrolyte secondary battery disclosed here is provided with an electrode body including a positive electrode that contains a positive electrode active material, and a negative electrode that contains a negative electrode active material, a non-aqueous electrolyte, and a battery case that houses the electrode body and the non-aqueous electrolyte. The non-aqueous electrolyte contains a complex, which contains copper (I) chloride as a constituent component and which is capable of adsorbing (absorbing) at least carbon monoxide and carbon dioxide. A coating film that contains at least one of phosphorus and boron is formed on the surface of the negative electrode active material.

In the non-aqueous electrolyte secondary battery provided by the present invention, a coating film that contains at least one of phosphorus and boron is formed on the surface of the negative electrode active material, and the non-aqueous electrolyte contains a copper (I) chloride complex.

According to this constitution, CO and $CO_2$, which are generated when the coating film that contains at least one of phosphorus and boron is formed on the surface of the negative electrode active material, are adsorbed by the copper (I) chloride complex contained in the non-aqueous electrolyte. In this way, an increase in pressure inside the battery case is suppressed. Therefore, deformation of the battery case (and in particular deformation in the thickness direction) caused by the generation of gas is prevented and it is possible to produce a non-aqueous electrolyte secondary battery able to stably constitute a battery pack at a preset binding force. In addition, because a coating film that contains at least one of phosphorus and boron is formed in a preferred form on the surface of the negative electrode active material, the non-aqueous electrolyte secondary battery exhibits excellent battery characteristics. It is preferable for the complex containing copper (I) chloride as a constituent component to be a copper (I) chloride-pyridine complex. The copper (I) chloride-pyridine complex is particularly excellent in terms of absorbing (adsorbing) CO and $CO_2$.

In a preferred aspect of the non-aqueous electrolyte secondary battery disclosed here, the non-aqueous electrolyte further contains further contains a gas generating agent able to generate a gas through decomposition when the battery voltage exceeds a prescribed voltage, and the battery case is provided with a current interrupt device that activates when the pressure inside the battery case rises as a result of the gas being generated. It is preferable for CO and $CO_2$ to be adsorbed by the copper (I) chloride complex.

According to this constitution, the gas generating agent decomposes and generates gas when the battery voltage of the non-aqueous electrolyte secondary battery exceeds a prescribed voltage. The generated gas causes the pressure inside the battery case to rise. When the pressure inside the battery case exceeds a prescribed value, the current interrupt device activates. When CO and $CO_2$ are adsorbed by the copper (I) chloride complex contained in the non-aqueous electrolyte, the CO and $CO_2$ are released from the copper (I) chloride complex into the battery case. Therefore, when the battery voltage of the non-aqueous electrolyte secondary battery exceeds a prescribed battery voltage, the quantity of gas able to be present inside the battery case increases. As a result, the current interrupt device can activate rapidly. Therefore, it is possible to obtain a highly reliable non-aqueous electrolyte secondary battery in which it is possible to ensure that a sufficient quantity of gas is generated when the battery voltage exceeds a prescribed voltage.

In addition, the present invention provides, as another aspect, a structure for constituting the non-aqueous electrolyte secondary battery disclosed here, that is, a non-aqueous electrolyte secondary battery assembly prior to initial charging, which is provided with: an electrode body including a positive electrode and a negative electrode; a non-aqueous electrolyte; and a battery case that houses the electrode body and the non-aqueous electrolyte. In this assembly, the non-aqueous electrolyte contains an oxalate complex compound which contains at least one of phosphorus and boron as a constituent element, and a complex which contains copper (I) chloride as a constituent component and which is capable of adsorbing at least carbon monoxide and carbon dioxide.

In this assembly, the non-aqueous electrolyte contains a copper (I) chloride complex. Therefore, by subjecting the assembly to initial charging up to a prescribed battery voltage, gases (typically CO and $CO_2$) generated by the reductive decomposition of the oxalate complex compound are adsorbed by the copper (I) chloride complex. In this way, it is possible to obtain a non-aqueous electrolyte secondary battery in which an increase in pressure inside the battery case is suppressed and in which a coating film is formed in a preferred form on the surface of the negative electrode active material by reductive decomposition of the oxalate complex compound. It is preferable for the complex containing copper (I) chloride as a constituent component to be a copper (I) chloride-pyridine complex. The copper (I) chloride-pyridine complex is particularly excellent in terms of absorbing (adsorbing) CO and $CO_2$.

In a preferred aspect of the assembly disclosed here, the non-aqueous electrolyte further contains a gas generating agent able to generate a gas through decomposition when the battery voltage exceeds a prescribed voltage, and the battery case is provided with a current interrupt device that activates when the pressure inside the battery case rises as a result of the gas being generated.

According to this constitution, by subjecting the assembly to initial charging up to a prescribed battery voltage, CO and $CO_2$ generated by the reductive decomposition of the oxalate complex compound are adsorbed by the copper (I) chloride complex (for example, a copper (I) chloride-pyridine complex). In this way, it is possible to obtain a non-aqueous electrolyte secondary battery in which an increase in pressure inside the battery case is suppressed. Furthermore, the gas generating agent decomposes and generates gas when the battery voltage of the obtained non-aqueous electrolyte secondary battery exceeds a prescribed voltage. The generated gas causes the pressure inside the battery case to rise. When the pressure inside the battery case exceeds a prescribed value, the current interrupt device activates. Here, CO and $CO_2$ adsorbed by the copper (I) chloride complex are released from the copper (I) chloride complex into the battery case. Therefore, when the battery voltage of the non-aqueous electrolyte secondary battery exceeds a prescribed voltage, the quantity of gas able to be present inside the battery case increases, and the current interrupt device can activate rapidly.

In another preferred aspect of the assembly disclosed here, the concentration of the complex in the non-aqueous electrolyte is at least 16 mol/L relative to 1 mol/L of the oxalate complex compound.

According to this constitution, a large quantity of the copper (I) chloride complex is present in the non-aqueous electrolyte. Therefore, most of the CO and $CO_2$ generated when the initial charging is carried out is adsorbed by the copper (I) chloride complex.

In another preferred aspect of the assembly disclosed here, the concentration of the oxalate complex compound in the non-aqueous electrolyte is 0.02 mol/L to 0.04 mol/L.

By subjecting the assembly to initial charging, the reactive resistance is reduced and it is possible to obtain a non-aqueous electrolyte secondary battery having an excellent capacity retention rate.

In another preferred aspect of the assembly disclosed here, the oxalate complex compound is $LiPF_2(C_2O_4)_2$.

By subjecting the assembly to initial charging, it is possible to obtain a non-aqueous electrolyte secondary battery in which a coating film is formed in a preferred form on the surface of the negative electrode active material.

As mentioned above, in the non-aqueous electrolyte secondary batteries disclosed here or in a non-aqueous electrolyte secondary battery (for example, a lithium ion secondary battery) obtained by using the production method disclosed here, because a coating film is formed in a preferred form on the surface of the negative electrode active material, battery performance is excellent and an increase in pressure inside the battery case is suppressed, and it is therefore possible to obtain a non-aqueous electrolyte secondary battery in which the prescribed shape of the battery case is maintained. Therefore, the non-aqueous electrolyte secondary batteries disclosed here or non-aqueous electrolyte secondary batteries obtained by using the production method disclosed here can be used as battery packs in which a plurality of (for example, 40 to 80) batteries are connected (typically connected in series) at a prescribed binding force. In addition, the non-aqueous electrolyte secondary batteries disclosed here or non-aqueous electrolyte secondary batteries obtained by using the production method disclosed here can be used as motive power sources for vehicles (typically an automobile, and especially an automobile provided with an electric motor, such as a hybrid vehicle, an electric vehicle or a fuel cell vehicle).

DESCRIPTION OF EMBODIMENTS

Preferred embodiments of the present invention will now be explained. Moreover, matters which are essential for carrying out the present invention and which are matters other than those explicitly mentioned in the present description are matters that a person skilled in the art could understand to be matters of design on the basis of the prior art in this technical field. The present invention can be carried out on the basis of the matters disclosed in the present description and common general technical knowledge in this technical field. Hereinafter, detailed explanations may be given by using lithium ion secondary batteries as typical examples, but the scope of the present invention is not intended to be limited to such batteries.

A preferred embodiment of a method for producing the non-aqueous electrolyte secondary battery disclosed here will be explained in detail by using a method for producing a lithium ion secondary battery as an example, but the scope of the present invention is not intended to be limited to this type of secondary battery. For example, it is possible to use a non-aqueous electrolyte secondary battery that uses other metal ions (for example, magnesium ions) as charge carriers.

Figure 3:
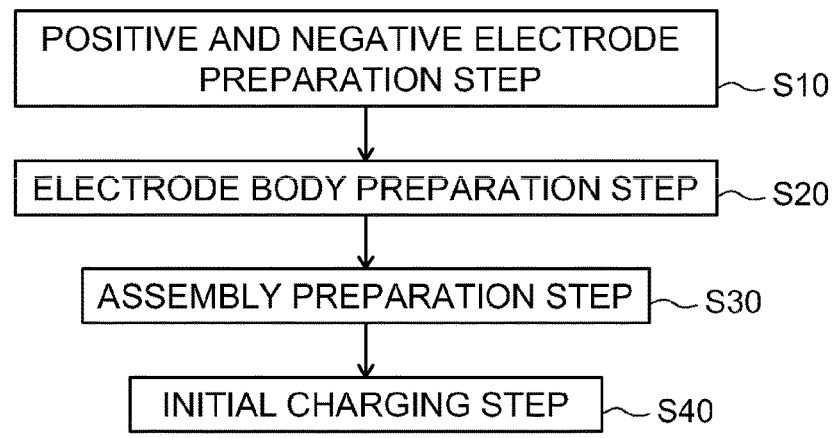
FIG. 3 is a flow chart for explaining the method for producing a non-aqueous electrolyte secondary battery according to one embodiment of the present invention.

The method for producing a lithium ion secondary battery (a non-aqueous electrolyte secondary battery) disclosed here includes a positive and negative electrode preparation step (S10), an electrode body preparation step (S20), an assembly preparation step (S30), and an initial charging step (S40), as shown in FIG. 3.

<<Positive and Negative Electrode Preparation Step (S10)>>

First, an explanation will be given of the positive and negative electrode preparation step (S10). In the present embodiment, a positive electrode that contains a positive electrode active material, and a negative electrode that contains a negative electrode active material are prepared in the positive and negative electrode preparation step. In a preferred embodiment, a separator, which is disposed between the positive electrode and the negative electrode, is also prepared.

The negative electrode of the lithium ion secondary battery disclosed here is provided with a negative electrode current collector and a negative electrode mixture layer, which is formed on the surface of the negative electrode current collector and which contains at least a negative electrode active material. In addition to the negative electrode active material, the negative electrode mixture layer may, if necessary, contain optional components such as binding agents and thickening agents.

In the same way as current collectors able to be used in negative electrodes of conventional lithium ion secondary batteries, an electrically conductive material made of a metal that exhibits good electrical conductivity can be advantageously used as the negative electrode current collector. For example, it is possible to use copper, nickel or an alloy made mainly of these. The shape of the negative electrode current collector is not particularly limited due to being able to differ according to the shape of the lithium ion secondary battery and the like, and can be a variety of shapes, such as foil-shaped, sheet-shaped, rod-shaped or plate-shaped.

The negative electrode active material is not particularly limited, and can be one or two or more types of material previously used in lithium ion secondary batteries. For example, it is possible to use a particulate (or spherical or flaky) carbon material containing graphite in at least a part of the material, a lithium-transition metal composite oxide (for example, a lithium-titanium composite oxide such as $Li_4Ti_5O_{12}$) or a lithium-transition metal composite nitride. Examples of the carbon material include natural graphite, artificial graphite, poorly graphitizable carbon (hard carbon) and readily graphitizable carbon (soft carbon). The average particle diameter of the negative electrode active material is, for example, 1 μm to 50 μm (generally 5 μm to 30 μm). Moreover, the average particle diameter means the median diameter (D50:50% volume average particle diameter), which is derived from the particle size distribution determined by measurements using a variety of commercially available laser diffraction/scattering type particle size distribution measurement apparatuses. In addition, the surface of the negative electrode active material may be coated with an amorphous carbon film. For example, it is possible to obtain a negative electrode active material in which at least a part of the negative electrode active material is coated with an amorphous carbon film by blending pitch with the negative electrode active material and then firing.

Binding agents similar to those used in negative electrodes of ordinary lithium ion secondary batteries can be used as appropriate as the binding agent. For example, in cases where a water-based paste-like composition is used to form the negative electrode mixture layer, a water-soluble polymeric material or water-dispersible polymeric material can be advantageously used. Examples of water-dispersible polymers include rubbers such as styrene-butadiene rubbers (SBR); polyethylene oxide (PEO); vinyl acetate copolymers, and the like. Styrene-butadiene rubbers can be advantageously used.

"Water-based paste-like composition" is a concept that indicates a composition in which water or a mixed solvent made mainly of water is used as a dispersion medium for a negative electrode active material. Solvents other than water that constitute the mixed solvent can be one or two or more types selected as appropriate from among organic solvents able to be homogeneously mixed with water (lower alcohols, lower ketones, and the like).

For example, a water-soluble or water-dispersible polymer can be used as the thickening agent. Examples of water-soluble polymers include cellulose-based polymers such as carboxymethyl cellulose (CMC), methyl cellulose (MC), cellulose acetate phthalate (CAP) and hydroxypropylmethyl cellulose (HPMC); polyvinyl alcohol (PVA), and the like. In addition, materials similar to those listed as being able to be used as the binding agent can be used as appropriate as the thickening agent.

The negative electrode disclosed here can be advantageously produced by using a procedure such as that described below. A paste-like negative electrode mixture layer-forming composition is prepared by dispersing the negative electrode active material and other optional components (binding agents, thickening agents, and the like) in an appropriate solvent (for example, water). By coating the prepared composition on a negative electrode current collector, drying and then pressing, it is possible to prepare a negative electrode provided with a negative electrode current collector and a negative electrode mixture layer formed on the negative electrode current collector.

The positive electrode of the lithium ion secondary battery disclosed here is provided with a positive electrode current collector and a positive electrode mixture layer, which is formed on the surface of the positive electrode current collector and which contains at least a positive electrode active material. In addition to the positive electrode active material, the positive electrode mixture layer may, if necessary, contain optional components such as electrically conductive materials and binding agents (binders).

In the same way as positive electrode current collectors able to be used in a positive electrodes of conventional lithium ion secondary batteries, aluminum and alloys made mainly of aluminum can be used as the positive electrode current collector. The shape of the positive electrode current collector may be similar to the shape of the negative electrode current collector.

The positive electrode active material is a material capable of storing and releasing lithium ions, examples of which include lithium-containing compounds that contain lithium element and one or two or more transition metal elements (for example, lithium-transition metal composite oxides). Examples thereof include lithium-nickel composite oxides (for example, $LiNiO_2$), lithium-cobalt composite oxides (for example, $LiCoO_2$), lithium-manganese composite oxides (for example, $LiMn_2O_4$) and ternary lithium-containing composite oxides such as lithium-nickel-cobalt-manganese composite oxides (for example, $LiNi_{1/3}Co_{1/3}Mn_{1/3}O_2$).

In addition, polyanion-based compounds such as those represented by the general formulae $LiMPO_4$, $LiMVO_4$ and $Li_2MSiO_4$ (in the formulae, M denotes at least one element selected from among Co, Ni, Mn, Fe, and the like) (for example, $LiFePO_4$, $LiMnPO_4$, $LiFeVO_4$, $LiMnVO_4$, $Li_2FeSiO_4$, $Li_2MnSiO_4$ and $Li_2CoSiO_4$) can be used as the positive electrode active material.

The electrically conductive material is not limited to specific electrically conductive materials as long as the material was able to be used in this type of lithium ion secondary battery in the past. For example, it is possible to use a carbon material such as carbon powder or carbon fibers. A variety of types of carbon black (for example, acetylene black, furnace black, ketjen black, and the like), graphite powder, and the like can be used as the carbon powder. Of these, acetylene black (AB) is preferred as the carbon powder. This type of electrically conductive material can be a single type or an appropriate combination of two or more types thereof.

Binding agents similar to those used in positive electrodes of ordinary lithium ion secondary batteries can be used as appropriate as the binding agent (binder). For example, in cases where a solvent-based paste-like composition (paste-like compositions also encompass slurry-like compositions and ink-like compositions) is used as a composition that forms the positive electrode mixture layer, it is possible to use a polymeric material that is soluble in organic solvents (non-aqueous solvents), such as polyvinylidene fluoride (PVDF) or polyvinylidene chloride (PVDC). Alternatively, in cases where a water-based paste-like composition is used, a water-soluble polymeric material (able to be dissolved in water) or water-dispersible polymeric material (able to be dispersed in water) can be advantageously used. For example, it is possible to use polytetrafluoroethylene (PTFE), carboxymethyl cellulose (CMC), a styrene-butadiene rubber (SBR), or the like. Moreover, the polymeric materials listed above can be used as binding agents, but can also be used as other additives, such as thickening agents for the composition.

Here, "solvent-based paste-like composition" is a concept that indicates a composition in which the dispersion medium for the positive electrode active material is mainly an organic solvent (a non-aqueous solvent). For example, N-methyl-2-pyrrolidone (NMP) or the like can be used as the organic solvent.

The positive electrode disclosed here can be advantageously produced by using a procedure such as that described below. A paste-like positive electrode mixture layer-forming composition is prepared by dispersing the positive electrode active material, an electrically conductive material and an organic solvent-soluble binding agent or the like in an organic solvent. By coating the prepared composition on a positive electrode current collector, drying and then pressing, it is possible to prepare a positive electrode provided with a positive electrode current collector and a positive electrode mixture layer formed on the positive electrode current collector.

Conventional publicly known separators can be used without limitation as the separator disclosed here. For example, a porous sheet formed of a synthetic resin (a microporous synthetic resin sheet) can be advantageously used. A porous polyolefin-based synthetic resin sheet such as polyethylene (PE) or polypropylene (PP) is preferred. For example, a single PE sheet, a single PP sheet, a sheet having a two-layer structure obtained by laminating a PE layer and a PP layer (a PE/PP structure), or a sheet having a three-layer structure obtained by laminating a PP layer on both sides of a PE layer (a PP/PE/PP structure) can be advantageously used.

<<Electrode Body Preparation Step (S20)>>

An explanation will now be given of the electrode body preparation step (S20). In the electrode body preparation step, an electrode body is prepared using the prepared positive electrode and negative electrode. Typically, the electrode body is prepared by using the prepared positive electrode, negative electrode and separator.

The electrode body (for example, a laminated electrode body or wound electrode body) of the lithium ion secondary battery disclosed here is provided with a positive electrode, a negative electrode and a separator interposed between the positive electrode and negative electrode. Here, an explanation will be given by using, as an example, a wound electrode body provided with the positive electrode formed as a sheet, the negative electrode formed as a sheet and the separator, but the electrode body is not intended to be limited to this mode.

Figure 2:
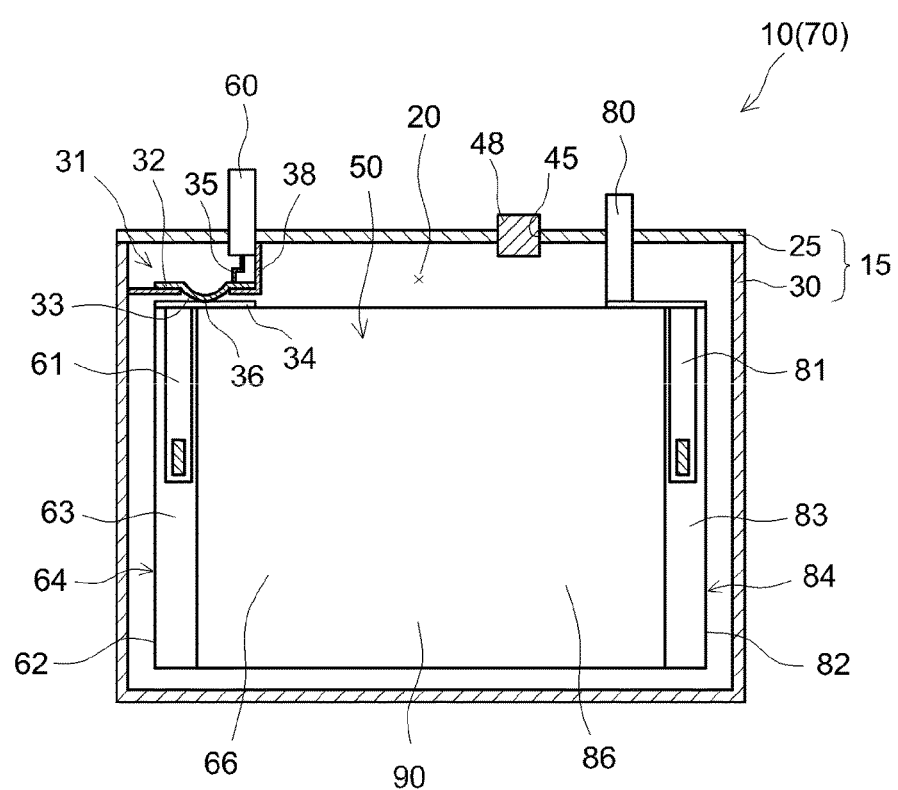
FIG. 2 is a cross-sectional view along the line shown by II-II in FIG. 1.

FIG. 2 shows a wound electrode body 50 according to the present embodiment. As shown in FIG. 2, the wound electrode body 50 is a flat wound electrode body 50 prepared by overlaying and winding a sheet-shaped positive electrode 64 and a sheet-shaped negative electrode 84, with two long separators 90 interposed therebetween, in the longitudinal direction, and then squeezing the obtained wound body from the sides.

When carrying out this overlaying, the positive electrode 64 and the negative electrode 84 are overlaid in a somewhat staggered manner in the width direction so that a positive electrode mixture layer-free part (that is, an exposed part on which the positive electrode mixture layer 66 is not formed and the positive electrode current collector 62 is exposed) 63 of the positive electrode 64 and a negative electrode mixture layer-free part (that is, an exposed part on which the negative electrode mixture layer 86 is not formed and the negative electrode current collector 82 is exposed) 83 of the negative electrode 84 protrude from the sides of the separator 90 in the width direction thereof. As a result, in the horizontal direction relative to the winding direction of the wound electrode body 50, the positive electrode mixture layer-free part 63 of the positive electrode 64 and the negative electrode mixture layer-free part 83 of the negative electrode 84 protrude externally from the winding core part (that is, the part where the positive electrode of mixture layer 66 of the positive electrode 64 and the negative electrode of mixture layer 86 of the negative electrode 84 are wound tightly with the two separator sheets 90). By joining a positive electrode terminal 60 (for example, aluminum) to the positive electrode mixture layer-free part 63 via a positive electrode current collector sheet 61, the positive electrode terminal 60 is electrically connected to the positive electrode 64 of the wound electrode body 50 that is formed into a flat shape. Similarly, by joining a negative electrode terminal 80 (for example, nickel) to the negative electrode mixture layer-free part 83 via a negative electrode current collector sheet 81, the negative electrode terminal 80 is electrically connected to the negative electrode 84. Moreover, the positive and negative electrode terminals 60 and 80 can be joined to the positive and negative electrode current collectors 62 and 82 by means of ultrasonic welding, resistance welding, or the like.

<<Assembly Preparation Step (S30)>>

An explanation will now be given of the assembly preparation step (S30). In the present embodiment, an assembly (a non-aqueous electrolyte secondary battery assembly) 70 is prepared by housing the wound electrode body 50, which was prepared as described above, in a battery case 15, and introducing a prescribed non-aqueous electrolyte into the battery case 15.

Figure 1:
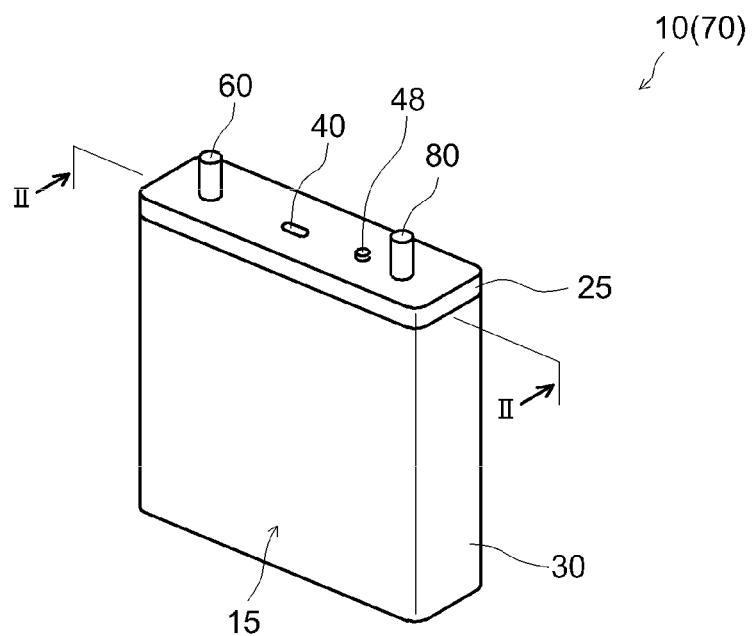
FIG. 1 is a perspective view showing a schematic representation of the external shape of a non-aqueous electrolyte secondary battery according to one embodiment of the present invention.

As shown in FIGS. 1 and 2, the battery case 15 in the present embodiment is a battery case made of a metal (for example, aluminum. In addition, a synthetic resin or laminate film battery case is also preferred), and is provided with a bottomed flat box-shaped (typically rectangular) case main body (an exterior case) 30, the top of which is open, and a lid 25 that seals the open part 20 of the case main body 30. The upper surface (that is, the lid 25) of the battery case 15 is provided with the positive electrode terminal 60, which is electrically connected to the positive electrode 64 of the wound electrode body 50, and the negative electrode terminal 80, which is electrically connected to the negative electrode 84 of the wound electrode body 50. In addition, an introduction hole 45, which is used to introduce the non-aqueous electrolyte described below into the case main body 30 (the battery case 15) that houses the wound electrode body 50, is formed in the lid 25. The introduction hole 45 is sealed by a sealing plug 48 after the non-aqueous electrolyte has been introduced. Furthermore, in the same way as a lid of a conventional lithium ion secondary battery, the lid 25 is provided with a safety valve 40, which is used to discharge gas, which is generated inside the battery case in the case of a battery abnormality, to outside the battery case 15. The wound electrode body 50 is housed in the case main body 30 in a form whereby the winding axis of the wound electrode body 50 lies horizontally (that is, the open part 20 is formed in a direction perpendicular to the winding axis of the wound electrode body 50). The assembly 70 is then prepared by sealing the open part 20 of the case main body 30 with the lid 25. The lid 25 and the case main body 30 are joined by means of welding or the like.

A current interrupt device (CID) 31, which activates when the pressure inside the battery case 15 rises, is provided inside the battery case 15 according to the present embodiment. The current interrupt device 31 cuts an electrically conductive path from at least one of the electrode terminals to the electrode body 50 (for example, the charging path) when the pressure inside the battery case 15 increases, and is not particularly limited in terms of form. In the embodiment shown in FIG. 2, the current interrupt device 31 is provided between the electrode body 50 and the positive electrode terminal 60, which is fixed on the lid 25, and is constituted so that when the pressure inside the battery case 15 rises, the electrically conductive path from the positive electrode terminal 60 to the electrode body 50 is cut.

More specifically, the current interrupt device 31 may include, for example, a first member 32 and a second member 34. In addition, the current interrupt device is constituted so that when the pressure inside the battery case 15 rises, at least one of the first member 32 and the second member 34 deforms and separates from the other member, thereby cutting the electrically conductive path. In the embodiment shown in FIG. 2, the first member 32 is a deforming metal plate and the second member 34 is a connecting metal plate that is joined to the deforming metal plate 32. The deforming metal plate (the first member) 32 is in the shape of an arch in which the central part of the arch curves downwards, and the peripheral part thereof is connected to the lower surface of the positive electrode terminal 60 via a current collector lead terminal 35. In addition, the tip of a curved part 33 of the deforming metal plate 32 is joined to the upper surface of the connecting metal plate 34. A positive electrode current collector sheet 61 is joined to the lower surface (back surface) of the connecting metal plate 34, and this positive electrode current collector sheet 61 is connected to the positive electrode 64 (the positive electrode current collector 62) of the electrode body 50. In this way, an electrically conductive path is formed from the positive electrode terminal 60 to the electrode body 50.

In addition, the current interrupt device 31 is provided with an insulating case 38 that is formed from a plastic or the like. The insulating case 38 is disposed so as to surround the deforming metal plate 32, and hermetically seals the upper surface of the deforming metal plate 32. The pressure inside the battery case 15 does not act on the upper surface of this hermetically sealed curved part 33. In addition, the insulating case 38 has an opening part that impacts upon the curved part 33 of the deforming metal plate 32, and the lower surface of the curved part 33 is exposed to the inside of the battery case 15 via this opening part. The pressure inside the battery case 15 acts on the lower surface of the curved part 33 that is exposed to the inside of the battery case 15. The constitution of the current interrupt device 31 is such that if the pressure inside the battery case 15 increases, the pressure acts on the lower surface of the curved part 33 of the deforming metal plate 32 and the curved part 33 is pushed upwards. The degree to which this curved part 33 is pushed upwards increases as the pressure inside the battery case 15 increases. In addition, if the pressure inside the battery case 15 exceeds a pre-set pressure, the curved part 33 becomes inverted and is deformed so as to curve upwards. When the curved part 33 deforms in this way, a junction 36 between the deforming metal plate 32 and the connecting metal plate 34 is broken. In this way, the electrically conductive path between the positive electrode terminal 60 and the electrode body 50 is cut and the overcharging current is interrupted.

Moreover, the current interrupt device 31 is not limited to the positive electrode terminal 60 side, and may also be provided on the negative electrode terminal 80 side. In addition, the current interrupt device 31 is not limited to mechanical interruption caused by the deformation of the deforming metal plate 32 described above, and it is also possible to provide, for example, an external circuit whereby the pressure inside the battery case 15 is detected by a sensor and the charging current is interrupted if the pressure detected by the sensor exceeds a pre-set pressure, as a current interrupt device.

The non-aqueous electrolyte disclosed here contains at least an oxalate complex compound, which contains at least one of phosphorus and boron as a constituent element (hereinafter referred to as a "BP-oxalate compound") as an additive, a complex, which contains copper (I) chloride as a constituent component and which is capable of adsorbing at least carbon monoxide and carbon dioxide (for example, a copper (I) chloride-pyridine complex), and a non-aqueous solvent (an organic solvent). Typically, it is possible to use a non-aqueous solvent that further contains, in addition to the components mentioned above, a lithium compound (a supporting electrolyte) able to be dissolved in the non-aqueous solvent and provide lithium ions. It is preferable for the non-aqueous electrolyte disclosed here to contain a gas generating agent able to generate a gas through decomposition when the battery voltage exceeds a prescribed voltage.

The BP-oxalate compound disclosed here is an oxalate compound having a structural moiety in which at least one oxalate ion ($C_2O_4^{2-}$) is coordinated to phosphorus (P) or boron (B). The BP-oxalate compound is not particularly limited to compounds prepared using publicly known methods or compounds procured by purchasing commercially available products, and it is possible to use one or two or more BP-oxalate compounds. An example of a preferred BP-oxalate compound is the phosphorus-containing oxalate complex compound represented by formula (I) below. Another example of a preferred BP-oxalate compound is the boron-containing oxalate complex compound represented by formula (II) below.

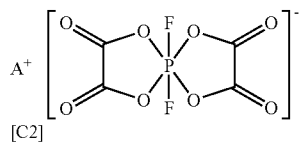

(I)

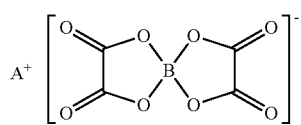

(II)

Here, $A^+$ in formulae (I) and (II) may be an inorganic cation or an organic cation. Specific examples of inorganic cations include alkali metal cations such as Li, Na and K; alkaline earth metal cations such as Be, Mg and Ca; other metal cations such as Ag, Zn, Cu, Co, Fe, Ni, Mn, Ti, Pb, Cr, V, Ru, Y, lanthanoids and actinoids; and protons. Specific examples of organic cations include tetraalkyl ammonium ions such as tetrabutyl ammonium ions, tetraethyl ammonium ions and tetramethyl ammonium ions; trialkyl ammonium ions such as triethyl methyl ammonium ions and triethyl ammonium ions; pyridinium ions, imidazolium ions, tetraethyl phosphonium ions, tetramethyl phosphonium ions, tetraphenyl phosphonium ions, triphenyl sulfonium ions and triethyl sulfonium ions. Preferred examples of cations include lithium ions, tetraalkyl ammonium ions and protons.

Compounds represented by formula (I) can be advantageously used as the BP-oxalate compound. Of these, $LiPF_2(C_2O_4)_2$ represented by formula (I) can be advantageously used. In addition, lithium bis(oxalate) borate ($LiB(C_2O_4)_2$) represented by formula (II) can be advantageously used.

The concentration of the BP-oxalate compound (for example, $LiPF_2(C_2O_4)_2$) in the non-aqueous electrolyte is, for example, 0.01 mol/L to 0.1 mol/L. This concentration is preferably 0.02 mol/L to 0.06 mol/L. This concentration is more preferably 0.02 mol/L to 0.04 mol/L. If the concentration of the BP-oxalate compound falls within this range, the effect of the invention of the present application can be better exhibited and higher battery performance can be achieved.

The complex containing copper (I) chloride as a constituent component (the copper (I) chloride complex) disclosed here is a complex able to adsorb (absorb) at least (molecular) carbon monoxide and (molecular) carbon dioxide. For example, it is possible to use a copper (I) chloride-pyridine complex, a copper (I) chloride-N,N,N',N'-tetramethyl-1,2-ethane diamine complex, a copper (I) chloride-methylpyridine complex, or the like. A copper (I) chloride-pyridine complex can be advantageously used. A copper (I) chloride-pyridine complex can absorb (adsorb) gases such as carbon monoxide (CO) and carbon dioxide ($CO_2$) at ordinary temperatures (for example, 20° C. to 30° C.), and can release absorbed (adsorbed) gases when the temperature reaches 70° C. or higher. The concentration of the copper (I) chloride complex (for example a copper (I) chloride-pyridine complex) in the non-aqueous electrolyte is, for example, 0.01 mol/L to 1 mol/L. This concentration is preferably 0.1 mol/L to 0.8 mol/L. If the concentration of the copper (I) chloride complex falls within this range, it is possible to satisfactorily absorb (adsorb) CO and $CO_2$ generated by the decomposition of the BP-oxalate compound. In addition, the concentration of the copper (I) chloride complex in the non-aqueous electrolyte is preferably at least 16 mol/L relative to 1 mol/L of the oxalate complex compound. In this way, almost all of the CO and $CO_2$ generated by the decomposition of the BP-oxalate compound is absorbed (adsorbed) by the copper (I) chloride complex. Aprotic solvents such as carbonates, esters, ethers, nitriles, sulfones and lactones can be used as the non-aqueous solvent (organic solvent). Examples thereof include carbonates such as ethylene carbonate (EC), propylene carbonate (PC), diethyl carbonate (DEC), dimethyl carbonate (DMC) and ethyl methyl carbonate (EMC). It is possible to use one of these organic solvents in isolation or a combination of two or more types thereof.

In addition, examples of supporting electrolytes (lithium compounds) include lithium salts such as $LiPF_6$, $LiClO_4$, LiAsF$_6$, Li(CF$_3$SO$_2$)$_2$N, LiBF$_4$ and LiCF$_3$SO$_3$. It is possible to use one of these supporting electrolytes in isolation or a combination of two or more types thereof. LiPF$_6$ is particularly preferred. The concentration of the supporting electrolyte is not particularly limited, but if this concentration is significantly too low, the quantity of charge carriers (typically lithium ions) contained in the non-aqueous electrolyte is insufficient and ionic conductivity tends to decrease. In addition, if this concentration is significantly too high, the viscosity of the non-aqueous electrolyte at temperatures at or below room temperature (for example, 0° C. to 30° C.) increases and ionic conductivity tends to decrease. Therefore, the concentration of the supporting electrolyte is, for example, preferably 0.1 mol/L or higher (for example, 0.8 mol/L or higher) and 2 mol/L or lower (for example, 1.5 mol/L or lower).

The gas generating agent can be one or two or more types selected from among gas generating agents used in similar applications as long as the gas generating agent is a compound able to generate gas through decomposition when the battery voltage exceeds a prescribed voltage (that is, a compound which has an oxidation potential that is no lower than the operating voltage of the lithium ion secondary battery (a sealed non-aqueous electrolyte secondary battery) and which generates gas through decomposition when the battery reaches an overcharged state). Specifically, the gas generating agent can be an aromatic compound such as a biphenyl compound, an alkylbiphenyl compound, a cycloalkyl benzene compound, an alkylbenzene compound, an organophosphorus compound, a fluorine-substituted aromatic compound, a carbonate compound, a cyclic carbamate compound or an alicyclic hydrocarbon. Examples of specific compounds (and the oxidation potential (vs. Li/Li$^+$) of these compounds) include biphenyl (4.5 V), cyclohexylbenzene (4.6 V), 1-fluoro-2-cyclohexylbenzene (4.8 V) and 1-fluoro-3-cyclohexylbenzene (4.8 V). Of these, cyclohexylbenzene and biphenyl can be advantageously used.

The added quantity of the gas generating agent is not particularly limited, but if this added quantity is significantly too low, the quantity of gas generated upon overcharging is reduced and there are concerns that the current interrupt device may not activate correctly. In addition, if an excessive quantity of gas generating agent is added for reasons of reliability, there are concerns that battery performance may deteriorate. Therefore, the added quantity of the gas generating agent is preferably 0.1 mass % or higher (typically 0.5 mass % or higher, for example 1 mass % or higher) and 10 mass % or lower (typically 5 mass % or lower, for example 4 mass % or lower, preferably 3 mass % or lower, and more preferably 2 mass % or lower), relative to 100 mass % of the non-aqueous electrolyte. If the added quantity of the gas generating agent falls within this range, it is possible to achieve both high reliability and high battery performance. Moreover, in cases where cyclohexylbenzene (CHB) and biphenyl (BP) are used as gas generating agents, if the quantity (mass %) of cyclohexylbenzene added to the non-aqueous electrolyte is taken to be A and the quantity (mass %) of biphenyl added to the non-aqueous electrolyte is taken to be B, the ratio A/B is preferably 1 to 4 (for example, A/B=3). If the value of A/B falls within this range, gas is generated satisfactorily upon decomposition of the cyclohexylbenzene and biphenyl, and the current interrupt device can therefore activate rapidly.

As shown in FIG. 2, the assembly 70 according to the present embodiment is a non-aqueous electrolyte secondary battery assembly 70 prior to initial charging, which is provided with a laminated or wound electrode body (a wound electrode body) 50, which includes a positive electrode 64 and a negative electrode 84, and a non-aqueous electrolyte. The non-aqueous electrolyte contains at least an oxalate complex compound, which contains at least one of phosphorus and boron as a constituent element, a complex, which contains copper (I) chloride as a constituent component and which is capable of adsorbing at least carbon monoxide and carbon dioxide, and a gas generating agent able to generate gas upon decomposition when the battery voltage exceeds a prescribed voltage.

<<Initial Charging Step (S40)>>

An explanation will now be given of the initial charging step (S40). In the present embodiment, by subjecting the assembly 70 to initial charging until a prescribed battery voltage is reached, a coating film derived from the BP-oxalate compound is formed on the surface of the negative electrode active material in the negative electrode mixture layer 86.

In the present step, the assembly 70 is charged up to the maximum voltage during normal usage (for example, 3.7 V to 4.1 V) at a charging rate of, for example, approximately 0.1 C to 2 C. During this initial charging, the BP-oxalate compound decomposes and a coating film derived from the BP-oxalate compound is formed on the surface of the negative electrode active material in the negative electrode mixture layer 86. CO and CO$_2$ are generated inside the battery case 15 by the decomposition of the BP-oxalate compound, but because the non-aqueous electrolyte contains the copper (I) chloride complex, the generated CO and CO$_2$ are absorbed (adsorbed) by the copper (I) chloride complex. In this way, it is possible to suppress an increase in the pressure inside the battery case 15. As a result, deformation of the battery case 15 (and in particular deformation in the thickness direction) caused by the generation of CO and CO$_2$ is prevented. Therefore, it is not necessary to remove gas generated inside the battery case 15 following a charging and discharging process. After subjecting the assembly 70 to this charging, the assembly 70 is discharged at a discharging rate of approximately 0.1 C to 2 C until a prescribed voltage (for example, 3 V to 3.2 V) is reached. In addition, it is preferable to repeat the charging and discharging a plurality of times (for example, 3 times). By subjecting the assembly 70 to charging and discharging treatment in this way, the assembly 70 becomes a usable battery, that is, a lithium ion secondary battery (a non-aqueous electrolyte secondary battery) 10 (see FIGS. 1 and 2). Moreover, "1 C" means a current flow at which the battery capacity (Ah), as predicted from the theoretical capacity of the positive electrode, can be charged in 1 hour.

Next, an explanation will be given of the lithium ion secondary battery (a non-aqueous electrolyte secondary battery) 10 produced using the production method disclosed here.

As shown in FIG. 2, the lithium ion secondary battery 10 according to the present embodiment is provided with the laminated or wound electrode body (a wound electrode body in this case) 50, which includes the positive electrode 64, the negative electrode 84 and the separator 90, a non-aqueous electrolyte, and the battery case 15 that houses the electrode body 50 and the non-aqueous electrolyte. The non-aqueous electrolyte may contain a complex, which contains copper (I) chloride as a constituent component and which is capable of adsorbing at least carbon monoxide and carbon dioxide (for example, a copper (I) chloride-pyridine complex), and a BP-oxalate compound that was not decomposed during the charging and discharging process mentioned above. The positive electrode 64 is provided with the positive electrode current collector 62 and the positive electrode mixture layer 66, which is formed on the surface of the positive electrode current collector 62 and which contains at least the positive electrode active material. The negative electrode 84 is provided with the negative electrode current collector 82 and the negative electrode mixture layer 86, which is formed on the surface of the negative electrode current collector 82 and which contains at least the negative electrode active material.

In the lithium ion secondary battery 10 according to the present embodiment, in the initial charging step (S40), the non-aqueous electrolyte contains a copper (I) chloride complex that absorbs (adsorbs) CO and $CO_2$ generated by the reductive decomposition of the BP-oxalate compound. Therefore, an increase in pressure inside the battery case 15 is suppressed, and deformation of the battery case 15 (and in particular deformation in the thickness direction) is prevented. In addition, because a coating film that contains at least one of phosphorus and boron is formed in a preferred form on the surface of the negative electrode active material, the lithium ion secondary battery 10 exhibits excellent battery characteristics. Moreover, the quantity of phosphorus (P) or boron (B) contained in the coating film can be determined by subjecting the coating film to analysis such as ICP (inductively coupled plasma) emission spectrometry or ion chromatography. Furthermore, if the battery voltage of the lithium ion secondary battery 10 exceeds a prescribed voltage, the gas generating agent in the non-aqueous electrolyte decomposes, and the generated gas causes the pressure inside the battery case 15 to rise, thereby activating the current interrupt device 31. At this point, CO and $CO_2$ adsorbed by the copper (I) chloride complex contained in the non-aqueous electrolyte are released from the copper (I) chloride complex into the battery case 15. Therefore, if the battery voltage of the lithium ion secondary battery 10 exceeds the prescribed voltage, the quantity of gas able to be present inside the battery case 15 increases, and the current interrupt device 31 can activate rapidly.

Next, an explanation will be given of an example of a battery pack (typically a battery pack in which a plurality of single batteries are connected in series) 200, in which the lithium ion secondary battery 10 is used as a single battery and a plurality of these single batteries are provided. In the single battery 10 according to the present embodiment, because deformation of the battery case 15 (and in particular deformation in the thickness direction) caused by the generation of gas is prevented, it is possible to stably constitute the battery pack 200 at a pre-set binding force.

Figure 4:
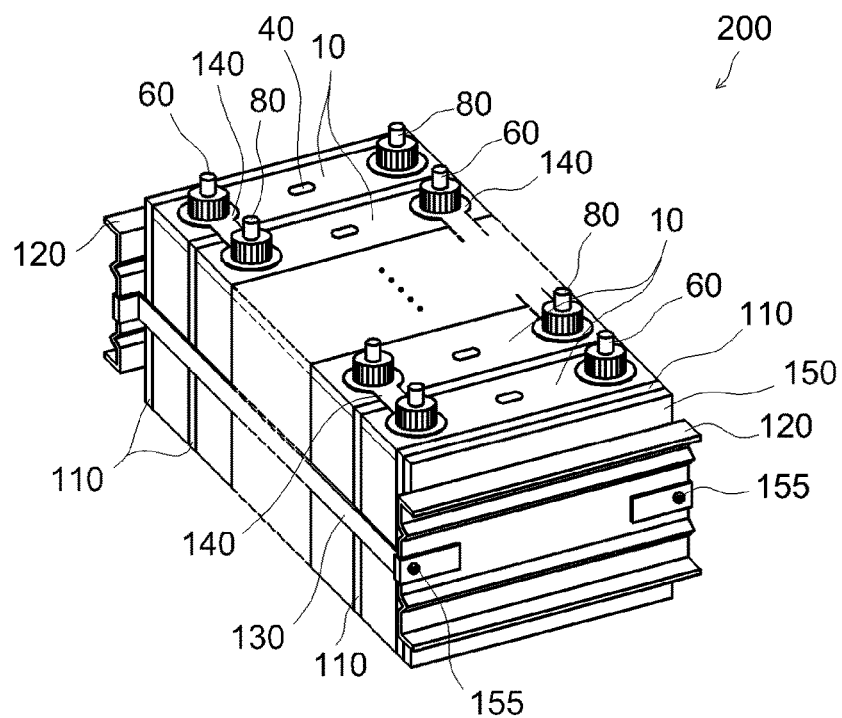
FIG. 4 is a perspective view showing a schematic representation of a battery pack obtained by combining a plurality of non-aqueous electrolyte secondary batteries according to one embodiment of the present invention.

As shown in FIG. 4, this battery pack 200 is obtained by reversing a plurality (typically 10 or more, preferably 40 to 80, for example 50) lithium ion secondary batteries (single batteries) 10 so that the positive electrode terminals 60 and negative electrode terminals 80 are disposed alternately, and the broad surfaces of the battery cases 15 are aligned so as to oppose each other (in the overlaying direction). Cooling plates 110 having prescribed shapes are interposed between the aligned single batteries 10. These cooling plates 110 function as heat-releasing members used to efficiently release heat generated inside the single batteries 10 during usage, and it is preferable for the cooling plates 110 to have a shape that enables a cooling fluid (typically air) to be introduced between the single batteries 10 (for example, a shape in which a plurality of parallel grooves are provided so as to extend perpendicularly from one edge to the opposing other edge of a rectangular cooling plate). It is preferable to use a cooling plate made from a metal having good thermal conductivity or a hard lightweight polypropylene or other synthetic resin.

A pair of end plates (binding plates) 120 are disposed at the ends of the aligned single batteries 10 and cooling plates 110. In addition, it is possible to interpose a sheet-shaped spacer member 150, or a plurality thereof, as length-adjusting means between a cooling plate 110 and an end plate 120. The aligned single batteries 10, cooling plates 110 and spacer members 150 are bound by applying a prescribed binding pressure in the overlaying direction by means of a tightening binding band 130 that is attached in such a way as to bridge the end plates 120. More specifically, by attaching and fixing one end of a binding band 130 to an end plate 120 by means of a screw 155, the above single batteries or the like are bound to each other due to the prescribed binding pressure being applied in the direction of alignment. In this way, the binding pressure is also applied to the wound electrode body 50 housed in the battery case 15 in each single battery 10. In the single battery 10 in the present embodiment, because deformation of the battery case 15 is prevented, a substantially equal binding pressure is applied to each single battery 10. In addition, the positive electrode terminal 60 of a single battery 10 is electrically connected to the negative electrode terminal 80 of an adjacent single battery 10 by means of a connecting member (a bus bar) 140. By connecting the single batteries 10 in series in this way, a battery pack 200 having a prescribed voltage is constituted.

Explanations will now be given of working examples relating to the present invention, but the present invention is not intended to be limited to these working examples.

TEST EXAMPLE 1

Example 1

[Preparation of Positive Electrode]
A paste-like positive electrode mixture layer-forming composition was prepared by weighing out $LiNi_{1/3}Co_{1/3}Mn_{1/3}O_2$ as a positive electrode active material, acetylene black (AB) as an electrically conductive material and PVDF as a binding agent at a mass ratio of 90:8:2, and dispersing these materials in NMP. A sheet-shaped positive electrode A in which a positive electrode mixture layer was formed on a positive electrode current collector at a mixture density of 2.8 g/cm$^3$ was prepared by coating this composition at a coating quantity of 25 mg/cm$^2$ per surface of a positive electrode current collector (an aluminum foil) having a thickness of 15 μm, drying, and then pressing.

[Preparation of Negative Electrode]
A paste-like negative electrode mixture layer-forming composition was prepared by weighing out natural graphite, an SBR as a binding agent and CMC as a thickening agent at a mass ratio of 98:1:1, and dispersing these materials in ion exchanged water. A sheet-shaped negative electrode A in which a negative electrode mixture layer was formed on a negative electrode current collector at a mixture density of 1.4 g/cm$^3$ was prepared by coating this composition at a coating quantity of 20 mg/cm$^2$ per surface of a negative electrode current collector (a copper foil) having a thickness of 10 μm, drying, and then pressing.

[Preparation of Separator]
A separator A having a three-layer structure was prepared by forming a porous polypropylene layer on both surfaces of a porous polyethylene layer. The separator A had a thickness of 20 μm, a length in the longitudinal direction of 1334 mm, and a length in the transverse direction of 61 mm.

[Preparation of Lithium Ion Secondary Battery (Non-Aqueous Electrolyte Secondary Battery)]

A wound electrode body according to Example 1 was prepared by winding the prepared positive electrode A and negative electrode A into an elliptical shape, with the separator A disposed between the positive electrode A and negative electrode A. Electrode terminals were connected to the terminals of the positive and negative electrode current collectors of the wound electrode body, respectively, and the wound electrode body was housed in an aluminum battery case having a height of 75 mm, a width of 120 mm, a depth of 15 mm and a case thickness of 1 mm. Next, an assembly according to Example 1 was prepared by introducing a non-aqueous electrolyte according to Example 1 into the battery case. The non-aqueous electrolyte according to Example 1 was obtained by dissolving $LiPF_2(C_2O_4)_2$ as an additive, a copper (I) chloride-pyridine complex and $LiPF_6$ as a supporting electrolyte in a non-aqueous solvent containing EC, DMC and EMC at a volume ratio of 3:4:3. In the non-aqueous electrolyte according to Example 1, the concentration of the $LiPF_2(C_2O_4)_2$ was 0.0125 mol/L, the concentration of the copper (I) chloride-pyridine complex was 0.12 mol/L, and the concentration of the $LiPF_6$ was 1 mol/L. Following the introduction of the non-aqueous electrolyte, the assembly according to Example 1 was subjected to initial charging and discharging. That is, the assembly was charged at a constant current and constant voltage at a temperature of 25° C. and a charging rate of 1 C (4 A) until a voltage of 4.1 V was reached, allowed to rest for 10 minutes, discharged at a constant current at a discharging rate of 1 C (4 A) until a voltage of 3 V was reached, and then allowed to rest for 10 minutes. A lithium ion secondary battery according to Example 1, which was provided with a negative electrode in which a coating film derived from $LiPF_2(C_2O_4)_2$ was formed on the surface of the negative electrode, was prepared in this way.

Examples 2 to 40

Assemblies and lithium ion secondary batteries according to Examples 2 to 40 were prepared in the same way as in Example 1, except that the concentration of the $LiPF_2(C_2O_4)_2$ and the concentration of the copper (I) chloride-pyridine complex in the non-aqueous electrolyte introduced into the battery case were altered as shown in Table 1. However, a copper (I) chloride-pyridine complex was not added to the non-aqueous electrolytes according to Examples 8, 16, 24, 32 and 40.

TABLE 1

| Example | $LiPF_2(C_2O_4)_2$ Concentration [mol/L] | Copper (I) chloride-pyridine complex Concentration [mol/L] | Quantity of gas generated [mL] |
|---|---|---|---|
| 1 | 0.0125 | 0.12 | 0.7 |
| 2 | 0.0125 | 0.2 | 0.33 |
| 3 | 0.0125 | 0.3 | 0.33 |
| 4 | 0.0125 | 0.4 | 0.26 |
| 5 | 0.0125 | 0.5 | 0.26 |
| 6 | 0.0125 | 0.6 | 0.32 |
| 7 | 0.0125 | 0.7 | 0.22 |
| 8 | 0.0125 | 0 | 1.26 |
| 9 | 0.025 | 0.12 | 1.31 |
| 10 | 0.025 | 0.2 | 0.89 |
| 11 | 0.025 | 0.3 | 0.66 |
| 12 | 0.025 | 0.4 | 0.44 |
| 13 | 0.025 | 0.5 | 0.31 |
| 14 | 0.025 | 0.6 | 0.24 |

TABLE 1-continued

| Example | $LiPF_2(C_2O_4)_2$ Concentration [mol/L] | Copper (I) chloride-pyridine complex Concentration [mol/L] | Quantity of gas generated [mL] |
|---|---|---|---|
| 15 | 0.025 | 0.7 | 0.21 |
| 16 | 0.025 | 0 | 2.18 |
| 17 | 0.0375 | 0.12 | 2.78 |
| 18 | 0.0375 | 0.2 | 2.37 |
| 19 | 0.0375 | 0.3 | 1.7 |
| 20 | 0.0375 | 0.4 | 1.17 |
| 21 | 0.0375 | 0.5 | 0.94 |
| 22 | 0.0375 | 0.6 | 0.36 |
| 23 | 0.0375 | 0.7 | 0.315 |
| 24 | 0.0375 | 0 | 3.74 |
| 25 | 0.05 | 0.12 | 3.85 |
| 26 | 0.05 | 0.2 | 3.63 |
| 27 | 0.05 | 0.3 | 2.96 |
| 28 | 0.05 | 0.4 | 2.56 |
| 29 | 0.05 | 0.5 | 1.93 |
| 30 | 0.05 | 0.6 | 1.22 |
| 31 | 0.05 | 0.7 | 1.04 |
| 32 | 0.05 | 0 | 4.85 |
| 33 | 0.075 | 0.12 | 6.11 |
| 34 | 0.075 | 0.2 | 5.85 |
| 35 | 0.075 | 0.3 | 5.07 |
| 36 | 0.075 | 0.4 | 4.63 |
| 37 | 0.075 | 0.5 | 3.78 |
| 38 | 0.075 | 0.6 | 3.7 |
| 39 | 0.075 | 0.7 | 3 |
| 40 | 0.075 | 0 | 6.97 |

[Measurement of Quantity of Gas Generated]

Figure 6:
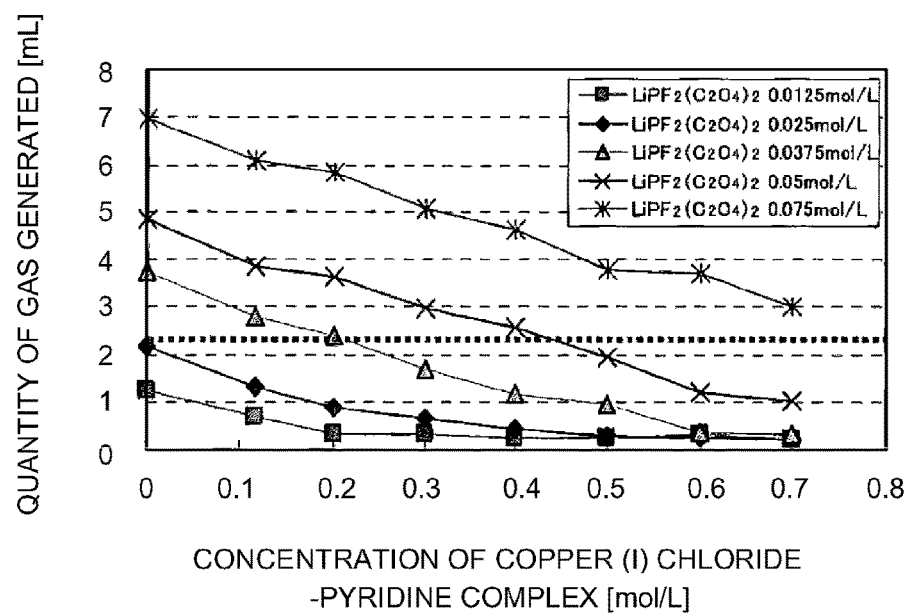
FIG. 6 is a graph that shows the relationship between the concentration of a copper (I) chloride-pyridine complex and the quantity of gas generated.

The assemblies according to Examples 1 to 40 were measured in terms of assembly volume using the Archimedes method. Next, the lithium ion secondary batteries according to Examples 1 to 40 were measured in terms of battery volume using the Archimedes method following initial charging and discharging. In addition, the quantity of gas generated during the initial charging and discharging (A-B) [mL] was calculated by subtracting the volume of the assembly (B) [mL] from the volume of the lithium ion secondary battery following initial charging and discharging (A) [mL]. The measurement results are shown in Table 1. In addition, FIG. 6 shows the relationship between the quantity of gas generated during the initial charging and discharging [mL] and the quantity of gas adsorbing agent [mmol/g]. Moreover, the Archimedes method is a method in which a measurement sample (an assembly or lithium ion secondary battery in these examples) is immersed in a fluid (for example, distilled water or an alcohol), and the volume of the measurement sample is determined by measuring the buoyant force acting on the measurement sample.

As shown in Table 1 and FIG. 6, it was confirmed that the quantity of gas generated was reduced by adding the copper (I) chloride-pyridine complex to the non-aqueous electrolyte. That is, it was confirmed that an increase in pressure inside the battery case was suppressed by adding the copper (I) chloride-pyridine complex to the non-aqueous electrolyte. This is because CO and $CO_2$ generated by decomposition of the $LiPF_2(C_2O_4)_2$ were adsorbed (absorbed) by the copper (I) chloride-pyridine complex.

In addition, in batteries provided with aluminum battery cases, if the quantity of gas generated exceeded 2.2 mL, the shape of the battery case was deformed (and especially the shape in the thickness direction) and it was difficult to constitute a battery pack at a pre-set binding force using a plurality of such batteries. Therefore, it was essential for the concentration of the $LiPF_2(C_2O_4)_2$ in the non-aqueous electrolyte introduced into the aluminum battery case to be 0.025 mol/L or lower. However, it was confirmed that by adding the copper (I) chloride-pyridine complex to the non-aqueous electrolyte, only a small quantity of gas was present inside the battery case and it was possible to suppress an increase in pressure inside the battery case even if the concentration of the $LiPF_2(C_2O_4)_2$ in the non-aqueous electrolyte introduced into the battery case exceeded 0.025 mol/L.

TEST EXAMPLE 2

Example 41 to 46

Lithium ion secondary batteries according to Examples 41 to 46 were prepared in the same way as in Example 1, except that the concentration of the copper (I) chloride-pyridine complex in the non-aqueous electrolyte introduced into the battery case was 0.2 mol/L and the concentration of the $LiPF_2(C_2O_4)_2$ in the non-aqueous electrolyte was altered as shown in Table 2. Moreover, $LiPF_2(C_2O_4)_2$ was not added to the non-aqueous electrolyte according to Example 46.

TABLE 2

| Example | $LiPF_2(C_2O_4)_2$ Concentration [mol/L] | Copper (I) chloride-pyridine complex Concentration [mol/L] | Capacity retention rate [%] | Initial reactive resistance [Ω] | Reactive resistance following storage [Ω] |
|---|---|---|---|---|---|
| 41 | 0.02 | 0.2 | 88 | 0.62 | 0.61 |
| 42 | 0.03 | 0.2 | 88.5 | 0.63 | 0.61 |
| 43 | 0.04 | 0.2 | 88.8 | 0.65 | 0.59 |
| 44 | 0.05 | 0.2 | 87.5 | 0.77 | 0.59 |
| 45 | 0.07 | 0.2 | 87 | 0.99 | 0.61 |
| 46 | 0 | 0.2 | 86 | 0.73 | 0.82 |

[Measurement of Initial Reactive Resistance]

The lithium ion secondary batteries according to Examples 41 to 46 were subjected to an appropriate conditioning treatment at a temperature of 25° C. (initial charging and discharging treatment formed of three repetitions of a process of charging a battery at a constant current and constant voltage at a charging rate of 0.1 C until a voltage of 4.1 V was reached and a process of discharging the battery at a constant current and constant voltage at a discharging rate of 0.1 C until a voltage of 3.0 V was reached), and then adjusted to a charged state corresponding to a SOC (State of Charge) of 40%. In addition, the lithium ion secondary batteries of Examples 29 to 34 were measured in terms of alternating current impedance at a temperature of −30° C. and a frequency of 0.001 Hz to 100,000 Hz, the diameter of an arc (semicircle) at a frequency of 0.01 Hz to 30 Hz was measured on the obtained Cole-Cole plot, and this value was taken to be the initial reactive resistance [Ω]. The obtained resistance values are shown in Table 2 and FIG. 7.

[Measurement of Reactive Resistance after Storage]

After being measured in terms of initial reactive resistance, the lithium ion secondary batteries of Examples 41 to 46 were adjusted to a SOC of 90%, and then stored for 30 days at a temperature of 60° C. After being stored, the lithium ion secondary batteries of Examples 41 to 46 were adjusted to a SOC of 40% and measured in terms of alternating current impedance at a temperature of −30° C. and a frequency of 0.001 Hz to 100,000 Hz, the diameter of an arc (semicircle) at a frequency of 0.01 Hz to 30 Hz was measured on the obtained Cole-Cole plot, and this value was taken to be the reactive resistance after storage [Ω.]. The obtained resistance values are shown in Table 2 and FIG. 7.

[Measurement of Capacity Retention Rate]

Figure 8:
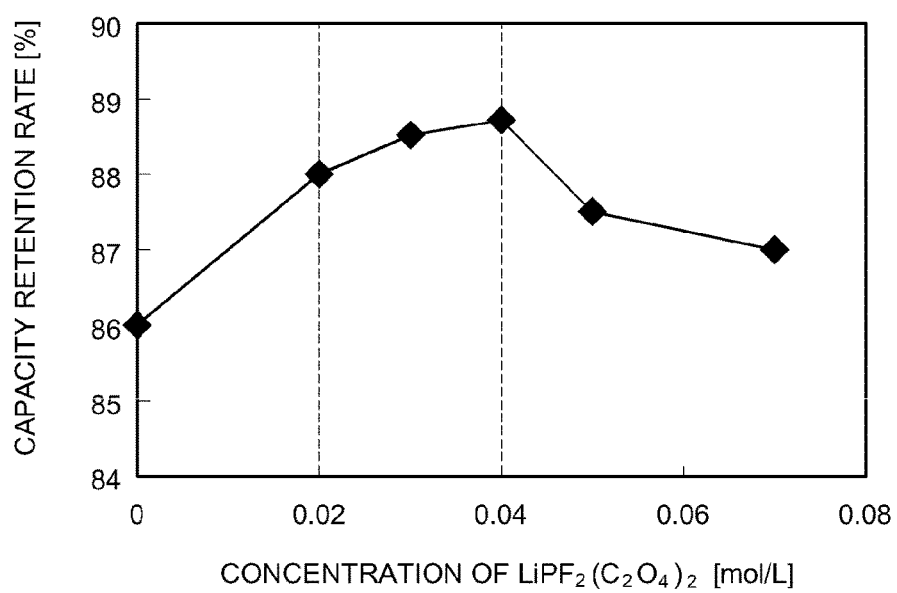
FIG. 8 is a graph that shows the relationship between the concentration of $LiPF_2(C_2O_4)_2$ and the capacity retention rate.

The lithium ion secondary batteries according to Examples 41 to 46 were measured in terms of capacity retention rate (%) after being stored for 30 days at a temperature of 60° C. First, at a temperature of 25° C., the lithium ion secondary batteries according to Examples 41 to 46 were charged for 3 hours at a constant current and constant voltage at a charging rate of 1 C until a voltage of 4.1 V was reached, and then allowed to rest for 10 minutes. Next, the batteries were subjected to constant current discharging for 6 hours at a discharging rate of 1/3 C until a voltage of 3 V was reached, and then allowed to rest for 10 minutes. Next, the batteries were subjected to constant current and constant voltage discharging for 4 hours at a discharging rate of 1/3 C until a voltage of 3 V was reached, and then allowed to rest for 10 minutes. The capacity at this point was taken to be the initial battery capacity. Next, the lithium ion secondary batteries whose initial battery capacity had been measured were adjusted to a SOC of 90%, and then stored for 30 days at a temperature of 60° C. After being stored, the lithium ion secondary batteries according to Examples 41 to 46 were measured in terms of battery capacity after storage using the same method as that used when measuring the initial battery capacity. Here, the value determined from the following relationship:

{(Battery capacity after storage)/(initial battery capacity)}×100 was taken to be the capacity retention rate (%) after 30 days storage. The measurement results are shown in Table 2 and FIG. 8.

Figure 7:
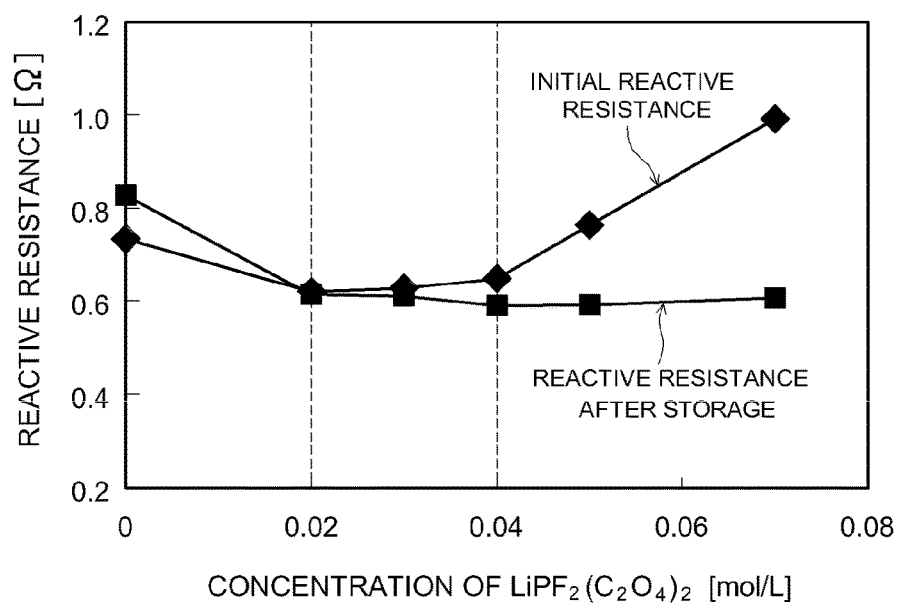
FIG. 7 is a graph that shows the relationship between the concentration of $LiPF_2(C_2O_4)_2$ and the reactive resistance.

As shown in Table 2 and FIG. 7, it was confirmed that the initial reactive resistance was lower in cases where the concentration of the $LiPF_2(C_2O_4)_2$ contained in the non-aqueous electrolyte was 0.02 mol/L to 0.04 mol/L. In addition, it was confirmed that the reactive resistance after storage was lower in cases where the concentration of the $LiPF_2(C_2O_4)_2$ in the non-aqueous electrolyte was 0.02 mol/L or higher. In addition, as shown in Table 2 and FIG. 8, it was confirmed that the capacity retention rate was higher in cases where the concentration of the $LiPF_2(C_2O_4)_2$ in the non-aqueous electrolyte was 0.02 mol/L to 0.04 mol/L. Therefore, it was confirmed that high battery performance was achieved in cases where the concentration of the $LiPF_2(C_2O_4)_2$ in the non-aqueous electrolyte was 0.02 mol/L to 0.04 mol/L.

TEST EXAMPLE 3

Example 47

[Preparation of Lithium Ion Secondary Battery (Non-Aqueous Electrolyte Secondary Battery)]

A wound electrode body according to Example 47 was prepared by winding the prepared positive electrode A and negative electrode A into an elliptical shape, with the separator A disposed between the positive electrode A and negative electrode A. Electrode terminals were connected to the terminals of the positive and negative electrode current collectors of the wound electrode body, and the wound electrode body was housed in an aluminum battery case having a height of 75 mm, a width of 120 mm, a depth of 15 mm and a case thickness of 1 mm. A pressure-activated current interrupt device that activated when the pressure inside the battery case exceeded $7.7 \times 10^5$ Pa was disposed near the open part of the battery case. Next, an assembly according to Example 47 was prepared by introducing a non-aqueous electrolyte according to Example 47 into the battery case. The non-aqueous electrolyte according to Example 47 was obtained by dissolving $LiPF_2(C_2O_4)_2$ as an additive, a copper (I) chloride-pyridine complex, $LiPF_6$ as a supporting electrolyte and biphenyl (BP) and cyclohexylbenzene (CHB) as gas generating agents in a non-aqueous solvent containing EC, DMC and EMC at a volume ratio of 3:4:3. In the non-aqueous electrolyte according to Example 47, the concentration of the $LiPF_2(C_2O_4)_2$ was 0.025 mol/L, the concentration of the copper (I) chloride-pyridine complex was 0.2 mol/L, and the concentration of the $LiPF_6$ was 1 mol/L. 2 mass % of biphenyl and 2 mass % of cyclohexylbenzene were added relative to 100 mass % of the non-aqueous electrolyte according to Example 47. After introducing the non-aqueous electrolyte, the assembly according to Example 47 was subjected to initial charging and discharging. That is, the assembly was subjected to constant current and constant voltage charging at a temperature of 25° C. and a charging rate of 1 C (4 A) until a voltage of 4.1 V was reached, allowed to rest for 10 minutes, subjected to constant current discharging at a discharging rate of 1 C (4 A) until a voltage of 3 V was reached, and then allowed to rest for 10 minutes. A lithium ion secondary battery according to Example 47, which was provided with a negative electrode in which a coating film derived from $LiPF_2(C_2O_4)_2$ was formed on the surface of the negative electrode, was prepared in this way.

Examples 48 to 51

Lithium ion secondary batteries according to Examples 48 to 51 were prepared in the same way as in Example 47, except that the concentration of the copper (I) chloride-pyridine complex and the concentration of the $LiPF_2(C_2O_4)_2$ and the quantity of the gas generating agents in the non-aqueous electrolyte were altered as shown in Table 3. Moreover, 1 mmol of the copper (I) chloride-pyridine complex was supported on 1 g of separator A in the lithium ion secondary battery according to Example 49. The mass of separator A was 1.55 g.

TABLE 3

| Example | $LiPF_2(C_2O_4)_2$ Concentration [mol/L] | Copper (I) chloride-pyridine complex Concentration [mol/L] | Supported quantity of copper (I) chloride-pyridine complex [mmol/g] | Gas generating agent BP [mass %] | CHB [mass %] | SOC at CID activation [%] |
|---|---|---|---|---|---|---|
| 47 | 0.025 | 0.2 | — | 2 | 2 | 137 |
| 48 | 0.025 | 0.2 | — | 1 | 1 | 149 |
| 49 | 0.025 | — | 1 | 2 | 2 | 144 |
| 50 | 0.025 | — | — | 2 | 2 | 155 |
| 51 | 0.025 | 0.2 | — | — | — | — |

[Overcharging Test]

The prepared lithium ion secondary batteries according to Examples 47 to 51 were subjected to an appropriate conditioning treatment (for example, initial charging and discharging treatment formed of 2 to 3 repetitions of a process of subjecting a battery to constant current (CC) charging at a charging rate of 1/10 C of the theoretical positive electrode capacity for 3 hours, a process of subjecting the battery to constant current charging at a charging rate of 1/3 C until a voltage of 4.1 V was reached, and a process of subjecting the battery to constant current discharging at a discharging rate of 1/3 C until a voltage of 3.0 V was reached), and then adjusted to a charged state corresponding to a SOC of 100%. The adjusted lithium ion secondary batteries were subjected to constant current charging at a temperature of 25° C. at a charging rate of 1 C up to a SOC of 160%, with a SOC of 200% being the upper limit (that is, a test in which a charging current was continued to be forcibly applied to the lithium ion secondary battery once the charging was complete), and the SOC at which the current interrupt device (CID) activated was confirmed for each battery. The results are shown in Table 3 and FIG. 9. Moreover, the lithium ion secondary battery according to Example 51 experienced a defect (smoke was generated due to thermal runaway) before the current interrupt device activated.

Figure 9:
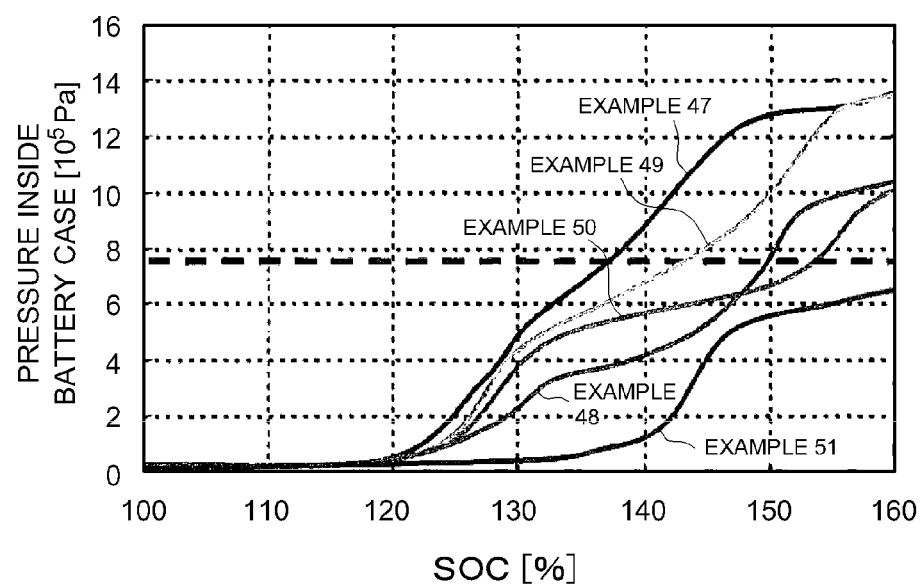
FIG. 9 is a graph that shows the change in pressure inside the battery case during overcharging.

As shown in Table 3 and FIG. 9, it was confirmed that in the lithium ion secondary battery according to Example 50, which did not contain a copper (I) chloride-pyridine complex, the current interrupt device did not activate unless the SOC was 155% or higher. Meanwhile, in the lithium ion secondary battery according to Example 47, which contained a copper (I) chloride-pyridine complex, the current interrupt device activated at a SOC of 137%, and it was possible to achieve activation of the current interrupt device at a SOC of 140% or lower. It was confirmed that in the lithium ion secondary batteries according to EXAMPLES 47 and 49, the current interrupt device activated more rapidly in cases where the copper (I) chloride-pyridine complex was added to the non-aqueous electrolyte than in cases where the copper (I) chloride-pyridine complex was supported on the separator. In addition, it was confirmed that in the lithium ion secondary battery according to Example 48, which contained a copper (I) chloride-pyridine complex in the non-aqueous electrolyte, the current interrupt device activated at a SOC of 149% despite the added quantity of gas generating agent being half that of the lithium ion secondary battery according to Example 50. That is, in lithium ion secondary batteries that contain a copper (I) chloride-pyridine complex in the non-aqueous electrolyte, it is possible to reduce the added quantity of gas generating agent compared to conventional lithium ion secondary batteries. Moreover, the lithium ion secondary battery according to Example 51 experienced a defect (smoke was generated due to thermal runaway) before the current interrupt device activated.

Specific examples of the present invention have been explained in detail above, but these are merely examples, and do not limit the scope of the present invention. The features disclosed in the claims also encompass modes obtained by variously modifying or altering the specific examples shown above.

INDUSTRIAL APPLICABILITY

Figure 5:
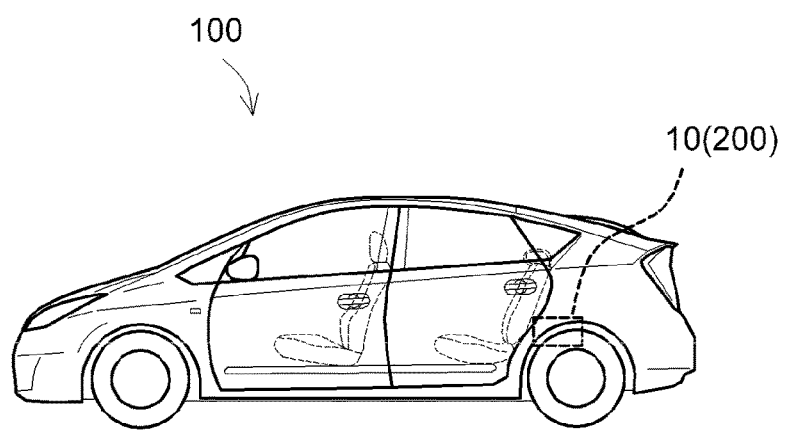
FIG. 5 is a side view showing a schematic representation of a vehicle (an automobile) equipped with the non-aqueous electrolyte secondary battery according to the present invention.

A non-aqueous electrolyte secondary battery obtained using the production method according to the present invention enables a reduction in battery resistance and enables high reliability by ensuring that a sufficient quantity of gas is generated when the pressure inside the battery case rises, and can therefore be used particularly advantageously as a motive power source fitted to a vehicle such as an automobile. Therefore, as shown schematically in FIG. 5, the present invention also provides a vehicle (typically an automobile, and especially an automobile provided with an electric motor, such as a hybrid vehicle, electric vehicle or fuel cell vehicle) 100 that is provided with this non-aqueous electrolyte secondary battery 10 (typically a battery pack 200 obtained by connecting a plurality of these batteries 10 in series) as a power source.

REFERENCE SIGNS LIST

10: Lithium ion secondary battery (non-aqueous electrolyte secondary battery)
31: Current interrupt device
40: Safety valve
50: Wound electrode body
62: Positive electrode current collector
64: Positive electrode
66: Positive electrode mixture layer
70: Assembly
82: Negative electrode current collector
84: Negative electrode
86: Negative electrode mixture layer
90: Separator

The invention claimed is:

1. A method for producing a non-aqueous electrolyte secondary battery that is provided with: an electrode body including a positive electrode that contains a positive electrode active material, and a negative electrode that contains a negative electrode active material; a non-aqueous electrolyte; and a battery case that houses the electrode body and the non-aqueous electrolyte, the method comprising the steps of:

preparing the positive electrode that contains the positive electrode active material, and the negative electrode that contains the negative electrode active material;

preparing the electrode body using the prepared positive electrode and negative electrode;

preparing an assembly by housing the electrode body in the battery case and introducing, into the battery case, the non-aqueous electrolyte which contains an oxalate complex compound containing at least one of phosphorus and boron as a constituent element, and a complex which contains copper (I) chloride as a constituent component and which is capable of adsorbing at least carbon monoxide and carbon dioxide; and subjecting the assembly to initial charging until a prescribed charging voltage is reached.

2. The method according to claim 1, wherein a copper (I) chloride-pyridine complex is used as the complex which contains copper (I) chloride as the constituent component.

3. The method according to claim 1, wherein the non-aqueous electrolyte further contains a gas generating agent able to generate a gas through decomposition when the battery voltage exceeds a second prescribed voltage, and the battery case is provided with a current interrupt device that activates when the pressure inside the battery case rises as a result of the gas being generated.

4. The method according to claim 1, wherein the concentration of the complex which contains copper (I) chloride as the constituent component in the non-aqueous electrolyte is 16 mol/L to 56 mol/L relative to 1 mol/L of the oxalate complex compound.

5. The method according to claim 1, wherein the concentration of the oxalate complex compound in the non-aqueous electrolyte is 0.02 mol/L to 0.04 mol/L.

6. The method according to claim 1, wherein $LiPF_2(C_2O_4)_2$ is used as the oxalate complex compound.

* * * * *